(12) United States Patent
Olvera (10) Patent No.: US 11,962,549 B2
(45) Date of Patent: Apr. 16, 2024

(54) SYSTEMS AND METHODS FOR QUEUE CALL WAITING DEFLECTION

(71) Applicant: Nuance Communications, Inc., Burlington, MA (US)

(72) Inventor: Eduardo Olvera, Phoenix, AZ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/554,743

(22) Filed: Dec. 17, 2021

(65) Prior Publication Data

US 2023/0198922 A1 Jun. 22, 2023

(51) Int. Cl.
| | |
|---|---|
| H04L 12/58 | (2006.01) |
| H04L 29/06 | (2006.01) |
| H04L 29/08 | (2006.01) |
| H04L 51/02 | (2022.01) |
| H04L 51/046 | (2022.01) |
| H04L 65/1096 | (2022.01) |
| H04L 65/80 | (2022.01) |
| H04L 67/60 | (2022.01) |

(52) U.S. Cl.
CPC ........... H04L 51/046 (2013.01); H04L 51/02 (2013.01); H04L 65/1096 (2013.01); H04L 65/80 (2013.01); H04L 67/60 (2022.05)

(58) Field of Classification Search
CPC ....... H04L 51/046; H04L 51/02; H04L 51/00; H04L 51/21; H04L 51/226; H04L 51/56; H04L 65/00; H04L 65/1066; H04L 65/1096; H04L 65/80; H04L 67/00; H04L 67/50; H04L 67/60–62

USPC ................................................. 709/206, 217
See application file for complete search history.

(56) References Cited

U.S. PATENT DOCUMENTS

| | | | | |
|---|---|---|---|---|
| 6,263,066 | B1 * | 7/2001 | Shtivelman | H04Q 3/66 |
| | | | | 379/265.09 |
| 6,714,643 | B1 * | 3/2004 | Gargeya | H04M 3/523 |
| | | | | 379/266.03 |
| 6,996,603 | B1 * | 2/2006 | Srinivasan | H04L 67/75 |
| | | | | 709/204 |
| 8,411,843 | B1 * | 4/2013 | Cyriac | H04M 3/4288 |
| | | | | 379/266.03 |
| 9,247,059 | B1 * | 1/2016 | Chidambaram | H04M 3/5166 |
| 9,319,526 | B2 * | 4/2016 | Olvera | H04M 3/5235 |

(Continued)

OTHER PUBLICATIONS

Abeykoon, R. M., H. U. W. Ratnayake, and G. S. N. Meedin. "Improving the Customer Experience using a Fair Call Distribution Model." Journal of Engineering and Technology (2019): 89. (Year: 2019).*

(Continued)

Primary Examiner — Boris D Grijalva Lobos
(74) Attorney, Agent, or Firm — Brian J. Colandreo; Heath M. Sargeant; Holland & Knight LLP (57) ABSTRACT

A method, computer program product, and computer system for placing, by a computing device, a user into a first queue on a first communication channel to converse with a second user. A trigger may be identified for the first communication channel. The user may be sent a self-service option based upon, at least in part, identifying the trigger for the first communication channel, wherein the self-service option is sent on an alternate communication channel while the user is in the first queue.

17 Claims, 4 Drawing Sheets

(56) References Cited

U.S. PATENT DOCUMENTS

| | | | | |
|---|---|---|---|---|
| 9,654,641 | B1* | 5/2017 | Chishti | H04M 3/5232 |
| 9,848,082 | B1* | 12/2017 | Lillard | H04M 3/53341 |
| 11,533,397 | B1* | 12/2022 | Hansen | H04M 3/382 |
| 2003/0009530 | A1* | 1/2003 | Philonenko | H04M 7/003 |
| | | | | 709/206 |
| 2006/0256956 | A1* | 11/2006 | Lee | H04M 3/5166 |
| | | | | 379/266.01 |
| 2013/0124641 | A1* | 5/2013 | Ryabchun | G06F 11/3495 |
| | | | | 709/224 |
| 2014/0270119 | A1* | 9/2014 | Bischoff | H04M 3/5183 |
| | | | | 379/265.09 |
| 2016/0036874 | A1* | 2/2016 | Mezhibovsky | G06Q 10/06314 |
| | | | | 705/7.19 |
| 2016/0065738 | A1* | 3/2016 | Schwartz | G06Q 30/016 |
| | | | | 379/265.03 |
| 2019/0208058 | A1* | 7/2019 | Dvorkin | H04M 3/5175 |
| 2019/0342226 | A1* | 11/2019 | Montcalm | H04M 3/523 |
| 2020/0153965 | A1* | 5/2020 | Dougherty | H04L 51/02 |
| 2021/0127008 | A1* | 4/2021 | Dougherty | H04M 3/5233 |
| 2021/0201238 | A1* | 7/2021 | Sekar | H04M 3/5191 |
| 2021/0321002 | A1* | 10/2021 | DiMaria | H04L 65/1069 |

OTHER PUBLICATIONS

Mohsin, "IVR Callback and Call Deflection to Chat reduces wait times", Linkedin (Year: 2020).*

"International Search Report and Written Opinion Issued in PCT Application No. PCT/US22/078629", dated Nov. 28, 2022, 9 Pages.

* cited by examiner

SYSTEMS AND METHODS FOR QUEUE CALL WAITING DEFLECTION

BACKGROUND

When a user needs to converse with another person (e.g., a customer service representative), the user typically is placed into a queue behind other users (or IM users when the conversation is IM based, live chat agent queues, virtual reality lines, etc.). Sometimes, the wait times to converse with a customer service representative/agent can take a long time, even easily exceeding 30 minutes across industries. This may cause user frustration, lower customer satisfaction, abandonment, and overall, increase contact center costs as the contact centers struggle to keep up with the increased demand in contact volumes.

BRIEF SUMMARY OF DISCLOSURE

In one example implementation, a method, performed by one or more computing devices, may include but is not limited to placing, by a computing device, a user into a first queue on a first communication channel to converse with a second user. A trigger may be identified for the first communication channel. The user may be sent a self-service option based upon, at least in part, identifying the trigger for the first communication channel, wherein the self-service option may be sent on an alternate communication channel while the user is in the first queue.

One or more of the following example features may be included. The trigger may be a threshold amount of time estimated for the user to be in the first queue on the first communication channel before being connected to the second user. The trigger may be a threshold amount of time for the user to be in the first queue on the first communication channel before being connected to the second user. The user may be placed into a second queue on a second communication channel to converse with a third user based upon, at least in part, identifying the trigger for the first communication channel, wherein the first communication channel and the second communication channel may be operating in parallel. Information collected during the self-service option may be forwarded to the second user. One of the first communication channel and the self-service option may be automatically terminated based upon, at least in part, receiving an input from one of the user and the second user. The user may be prioritized in one of the first queue on the first communication channel and the second queue on the second communication channel based upon, at least in part, a prior placement of the user in one of the first queue on the first communication channel and the second queue on the second communication channel.

In another example implementation, a computing system may include one or more processors and one or more memories configured to perform operations that may include but are not limited to placing, by a computing device, a user into a first queue on a first communication channel to converse with a second user. A trigger may be identified for the first communication channel. The user may be sent a self-service option based upon, at least in part, identifying the trigger for the first communication channel, wherein the self-service option may be sent on an alternate communication channel while the user is in the first queue.

One or more of the following example features may be included. The trigger may be a threshold amount of time estimated for the user to be in the first queue on the first communication channel before being connected to the second user. The trigger may be a threshold amount of time for the user to be in the first queue on the first communication channel before being connected to the second user. The user may be placed into a second queue on a second communication channel to converse with a third user based upon, at least in part, identifying the trigger for the first communication channel, wherein the first communication channel and the second communication channel may be operating in parallel. Information collected during the self-service option may be forwarded to the second user. One of the first communication channel and the self-service option may be automatically terminated based upon, at least in part, receiving an input from one of the user and the second user. The user may be prioritized in one of the first queue on the first communication channel and the second queue on the second communication channel based upon, at least in part, a prior placement of the user in one of the first queue on the first communication channel and the second queue on the second communication channel.

In another example implementation, a computer program product may reside on a computer readable storage medium having a plurality of instructions stored thereon which, when executed across one or more processors, may cause at least a portion of the one or more processors to perform operations that may include but are not limited to placing, by a computing device, a user into a first queue on a first communication channel to converse with a second user. A trigger may be identified for the first communication channel. The user may be sent a self-service option based upon, at least in part, identifying the trigger for the first communication channel, wherein the self-service option may be sent on an alternate communication channel while the user is in the first queue.

One or more of the following example features may be included. The trigger may be a threshold amount of time estimated for the user to be in the first queue on the first communication channel before being connected to the second user. The trigger may be a threshold amount of time for the user to be in the first queue on the first communication channel before being connected to the second user. The user may be placed into a second queue on a second communication channel to converse with a third user based upon, at least in part, identifying the trigger for the first communication channel, wherein the first communication channel and the second communication channel may be operating in parallel. Information collected during the self-service option may be forwarded to the second user. One of the first communication channel and the self-service option may be automatically terminated based upon, at least in part, receiving an input from one of the user and the second user. The user may be prioritized in one of the first queue on the first communication channel and the second queue on the second communication channel based upon, at least in part, a prior placement of the user in one of the first queue on the first communication channel and the second queue on the second communication channel.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings may indicate like elements.

DETAILED DESCRIPTION

System Overview

As noted above, when a user needs to converse with another person (e.g., a customer service representative also known as an agent), the user typically is placed into a queue behind other callers (or IM users when the conversation is IM based, live-chat agent queues, virtual reality lines, etc.). Sometimes, the wait times to converse with an agent can take a long time, even easily exceeding 30 minutes across industries. This may cause user frustration, lower customer satisfaction, abandonment, and overall, increase call center costs as the call centers struggles to keep up with the increased demand in call volumes. Call Center Deflection (where it is attempted to solve the user's issue without speaking with an agent) is normally achieved in one of two ways. 1) Prior to agent contact—once the user expresses the need to talk to an agent (e.g., live chat, phone agent), the system can offer alternative channels and/or mention hold times in an attempt to deflect the interaction to alternative digital channels (less expensive); 2) At the beginning of the agent contact—once a call is initiated, the system can "intercept" the call and offer instead a digital channel experience.

These approaches may not always work, and are not attempted while the call/chat is in progress, since once a call/chat is in a queue, there is no attempt to deflect the call or provide a solution that would facilitate it. Therefore, as will be discussed in greater detail below, the present disclosure may provide a third potential deflection option while the agent interaction has already started (particularly while a call/chat is in progress, or while a customer is waiting for their call to be answered or the live chat agent to first engage (queue waiting). It will be appreciated that other types of channels could be used without departing from the scope of the present disclosure, such as, e.g., love chat agent queues, virtual reality lines, etc.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a body area network BAN), a personal area network (PAN), a metropolitan area network (MAN), etc., or the connection may be made to an external computer (for example, through the internet using an Internet Service Provider). In some implementations, electronic circuitry including, for example, programmable logic circuitry, an application specific integrated circuit (ASIC), field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general-purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
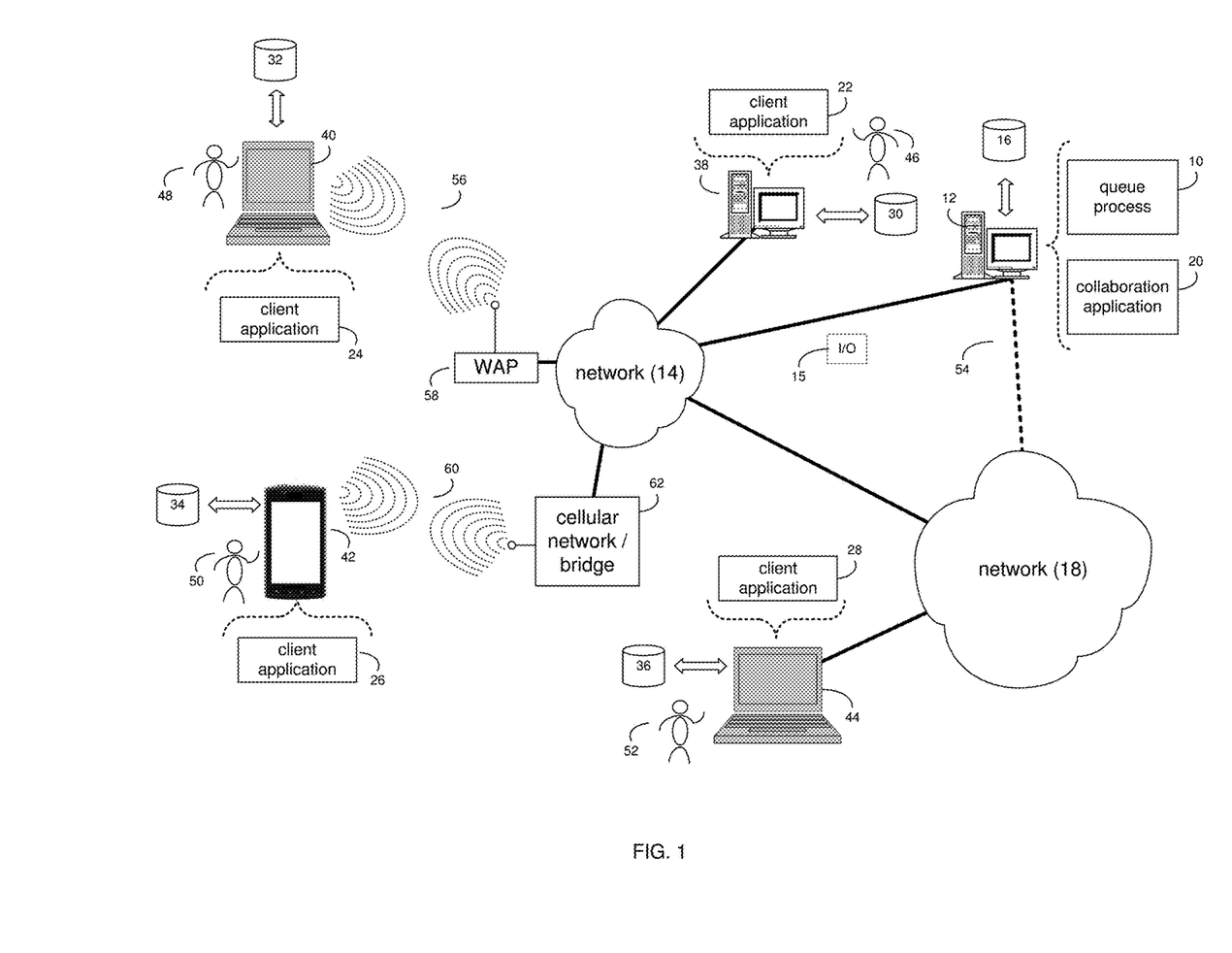
FIG. 1 is an example diagrammatic view of a queue process coupled to an example distributed computing network according to one or more example implementations of the disclosure.

Referring now to the example implementation of FIG. 1, there is shown queue process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). A SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a queue process, such as queue process 10 of FIG. 1, may place, by a computing device, a user into a first queue on a first communication channel to converse with a second user. A trigger may be identified for the first communication channel. The user may be sent a self-service option based upon, at least in part, identifying the trigger for the first communication channel, wherein the self-service option may be sent on an alternate communication channel while the user is in the first queue.

In some implementations, the instruction sets and sub-routines of queue process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random-access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, queue process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a collaboration application (e.g., collaboration application 20), examples of which may include, but are not limited to, e.g., an automatic speech recognition (ASR) application (e.g., speech recognition application 20), examples of which may include, but are not limited to, e.g., an automatic speech recognition (ASR) application (e.g., modeling, etc.), a natural language understanding (NLU) application (e.g., machine learning, intent discovery, etc.), a text to speech (TTS) application (e.g., context awareness, learning, etc.), a speech signal enhancement (SSE) application (e.g., multi-zone processing/beamforming, noise suppression, etc.), a voice biometrics/wake-up-word processing application, an interactive voice response (IVR) application, a web conferencing application, a video conferencing application, a voice-over-IP application, a video-over-IP application, an Instant Messaging (IM)/"chat" application, a chatbot application, a short messaging service (SMS)/multimedia messaging service (MMS) application, a telephone application, or other application that allows for remote text/voice conversing between two or more people. In some implementations, queue process 10 and/or collaboration application 20 may be accessed via one or more of client applications 22, 24, 26, 28. In some implementations, queue process 10 may be a standalone application, or may be an applet/application/script/extension that may interact with and/or be executed within collaboration application 20, a component of collaboration application 20, and/or one or more of client applications 22, 24, 26, 28. In some implementations, collaboration application 20 may be a standalone application, or may be an applet/application/script/extension that may interact with and/or be executed within queue process 10, a component of queue process 10, and/or one or more of client applications 22, 24, 26, 28. In some implementations, one or more client applications 22, 24, 26, 28 may be a standalone application, or may be an applet/application/script/extension that may interact with and/or be executed within and/or be a component of queue process 10 and/or collaboration application 20. Examples of client applications 22, 24, 26, 28 may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone (such as those embedded within eyeglasses, smart phones, tablet computers and/or watches, etc.), and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of queue process 10 (and vice versa). Accordingly, in some implementations, queue process 10 may be a purely server-side application, a purely client-side application, or a hybrid server-side/client-side application that is cooperatively executed by one or more of client applications 22, 24, 26, 28 and/or queue process 10.

In some implementations, one or more of client applications 22, 24, 26, 28 may be configured to effectuate some or all of the functionality of collaboration application 20 (and vice versa). Accordingly, in some implementations, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, queue process 10, and collaboration application 20, taken singly or in any combination, may effectuate some or all of the same functionality, any description of effectuating such functionality via one or more of client applications 22, 24, 26, 28, queue process 10, collaboration application 20, or combination thereof, and any described interaction(s) between one or more of client applications 22, 24, 26, 28, queue process 10, collaboration application 20, or combination thereof to effectuate such functionality, should be taken as an example only and not to limit the scope of the disclosure.

In some implementations, one or more of users 46, 48, 50, 52 may access computer 12 and queue process 10 (e.g., using one or more of client electronic devices 38, 40, 42, 44) directly through network 14 or through secondary network 18. Further, computer 12 may be connected to network 14 through secondary network 18, as illustrated with phantom link line 54. Queue process 10 may include one or more user interfaces, such as browsers and textual or graphical user interfaces, through which users 46, 48, 50, 52 may access queue process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12 (and vice versa). Examples of I/O request 15 may include but are not limited to, data write requests (e.g., a request that content be written to computer 12) and data read requests (e.g., a request that content be read from computer 12).

Figure 2:
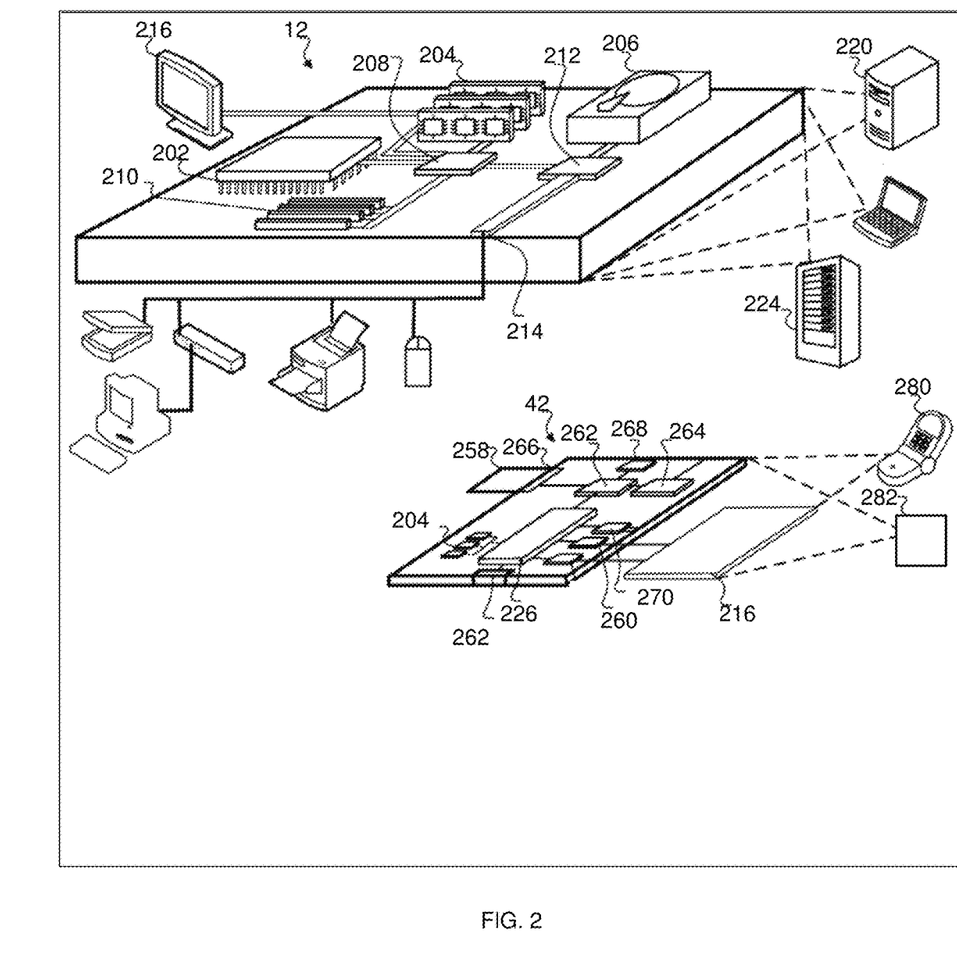
FIG. 2 is an example diagrammatic view of a computer and client electronic device of FIG. 1 according to one or more example implementations of the disclosure.

Referring also to the example implementation of FIG. 2, there is shown a diagrammatic view of computer 12 and client electronic device 42. While client electronic device 42 and computer 12 are shown in this figure, this is for example purposes only and is not intended to be a limitation of this disclosure, as other configurations are possible. Additionally, any computing device capable of executing, in whole or in part, queue process 10 may be substituted for client electronic device 42 and computer 12 (in whole or in part) within FIG. 2, examples of which may include but are not limited to one or more of client electronic devices 38, 40, and 44. Client electronic device 42 and/or computer 12 may also include other devices, such as televisions with one or more processors embedded therein or attached thereto as well as any of the microphones, microphone arrays, and/or speakers described herein. The components shown here, their connections and relationships, and their functions, are meant to be examples only, and are not meant to limit implementations of the disclosure described.

In some implementations, computer 12 may include processor 202, memory 204, storage device 206, a high-speed interface 208 connecting to memory 204 and high-speed expansion ports 210, and low speed interface 212 connecting to low-speed bus 214 and storage device 206. Each of the components 202, 204, 206, 208, 210, and 212, may be interconnected using various busses, and may be mounted on a common motherboard or in other manners as appropriate. The processor 202 can process instructions for execution within the computer 12, including instructions stored in the memory 204 or on the storage device 206 to display graphical information for a GUI on an external input/output device, such as display 216 coupled to high-speed interface 208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

Memory 204 may store information within the computer 12. In one implementation, memory 204 may be a volatile memory unit or units. In another implementation, memory 204 may be a non-volatile memory unit or units. The memory 204 may also be another form of computer-readable medium, such as a magnetic or optical disk.

Storage device 206 may be capable of providing mass storage for computer 12. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

High speed controller 208 may manage bandwidth-intensive operations for computer 12, while the low-speed controller 212 may manage lower bandwidth-intensive operations. Such allocation of functions is exemplary only. In one implementation, the high-speed controller 208 may be coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computer 12 may be implemented in a number of different forms, as shown in the figure. For example, computer 12 may be implemented as a standard server 220, or multiple times in a group of such servers. It may also be implemented as part of a rack server system 224. Alternatively, components from computer 12 may be combined with other components in a mobile device (not shown), such as client electronic device 42. Each of such devices may contain one or more of computer 12, client electronic device 42, and an entire system may be made up of multiple computing devices communicating with each other.

Client electronic device 42 may include processor 226, memory 204, an input/output device such as display 216, a communication interface 262, and a transceiver 264, among other components. Client electronic device 42 may also be provided with a storage device, such as a microdrive or other device, to provide additional storage. Each of the components 226, 204, 216, 262, and 264, may be interconnected using various buses, and several of the components may be mounted on a common motherboard or in other manners as appropriate.

Processor 226 may execute instructions within client electronic device 42, including instructions stored in the memory 204. The processor may be implemented as a chipset of chips that include separate and multiple analog and digital processors. The processor may provide, for example, for coordination of the other components of client electronic device 42, such as control of user interfaces, applications run by client electronic device 42, and wireless communication by client electronic device 42.

In some embodiments, processor 226 may communicate with a user through control interface 258 and display interface 260 coupled to a display 216. The display 216 may be, for example, a TFT LCD (Thin-Film-Transistor Liquid Crystal Display) or an OLED (Organic Light Emitting Diode) display, or other appropriate display technology. The display interface 260 may comprise appropriate circuitry for driving the display 216 to present graphical and other information to a user. The control interface 258 may receive commands from a user and convert them for submission to the processor 226. In addition, an external interface 262 may be provide in communication with processor 226, so as to enable near area communication of client electronic device 42 with other devices. External interface 262 may provide, for example, for wired communication in some implementations, or for wireless communication in other implementations, and multiple interfaces may also be used.

In some embodiments, memory 204 may store information within the Client electronic device 42. The memory 204 can be implemented as one or more of a computer-readable medium or media, a volatile memory unit or units, or a non-volatile memory unit or units. Expansion memory may also be provided and connected to client electronic device 42 through expansion interface 266, which may include, for example, a SIMM (Single In Line Memory Module) card interface. Such expansion memory may provide extra storage space for client electronic device 42, or may also store applications or other information for client electronic device 42. Specifically, expansion memory may include instructions to carry out or supplement the processes described above, and may include secure information also. Thus, for example, expansion memory may be provided as a security module for client electronic device 42, and may be programmed with instructions that permit secure use of client electronic device 42. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 204, expansion memory, memory on processor 226, or a propagated signal that may be received, for example, over transceiver 264 or external interface 262.

Client electronic device 42 may communicate wirelessly through communication interface 262, which may include digital signal processing circuitry where necessary. Communication interface 262 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 264. In addition, short-range communication may occur, such as using a Bluetooth, Wi-Fi, or other such transceiver (not shown). In addition, GPS (Global Positioning System) receiver module 268 may provide additional navigation and location-related wireless data to client electronic device 42, which may be used as appropriate by applications running on client electronic device 42.

Client electronic device 42 may also communicate audibly using audio codec 270, which may receive spoken information from a user and convert it to usable digital information. Audio codec 270 may likewise generate audible sound for a user, such as through a speaker, e.g., in a handset of client electronic device 42. Such sound may include sound from voice telephone calls, may include recorded sound (e.g., voice messages, music files, etc.) and may also include sound generated by applications operating on client electronic device 42.

Client electronic device 42 may be implemented in a number of different forms, as shown in the figure. For example, it may be implemented as a cellular telephone 280. It may also be implemented as part of a smartphone 282, personal digital assistant, remote control, or other similar mobile device.

The Queue Process

Figure 3:
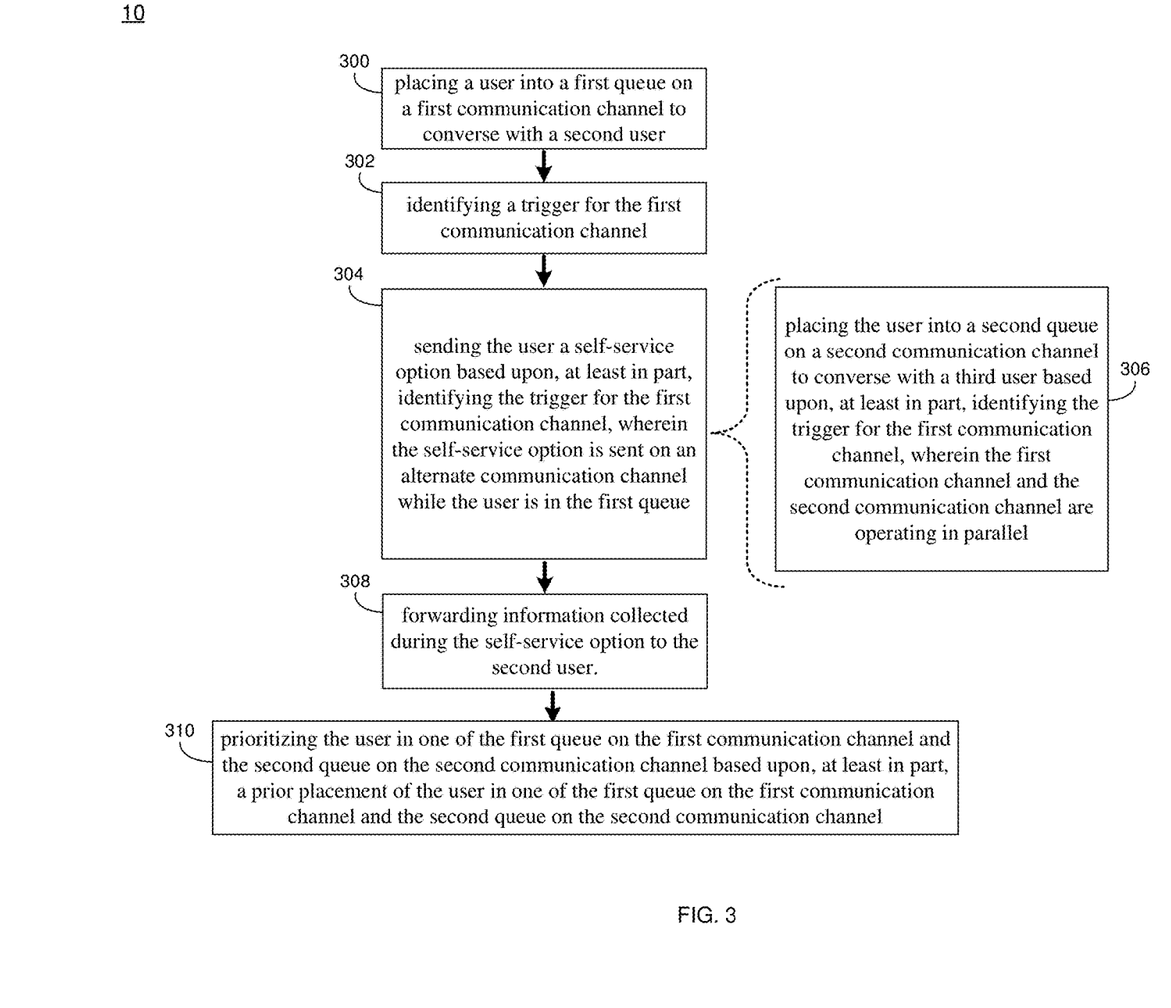
FIG. 3 is an example flowchart of a queue process according to one or more example implementations of the disclosure.
Figure 4:
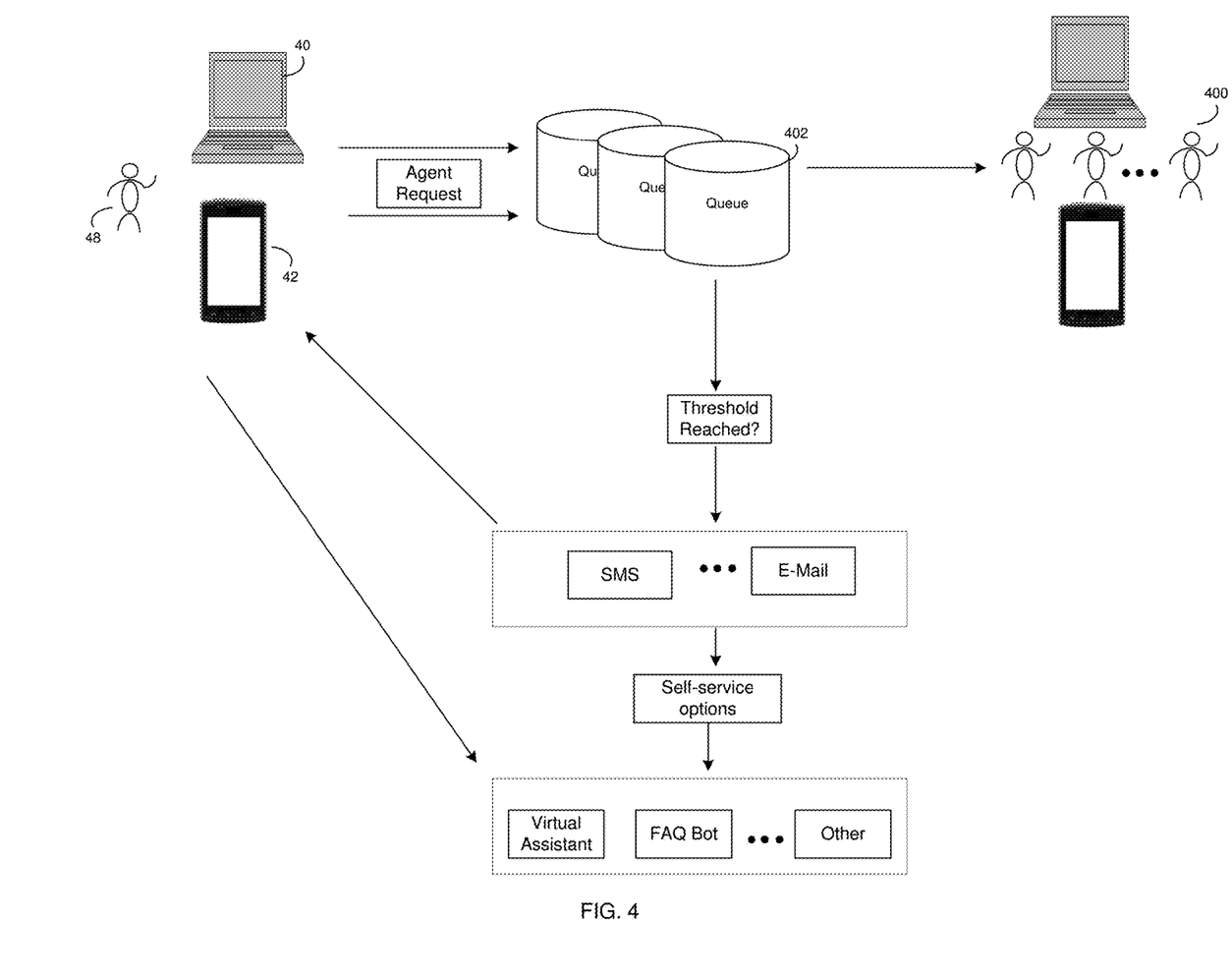
FIG. 4 is an example alternative view of a flowchart of a queue process according to one or more example implementations of the disclosure.

As discussed above and referring also at least to the example implementations of FIGS. 3-4, queue process 10 may place 300, by a computing device, a user into a first queue on a first communication channel to converse with a second user. Queue process 10 may identify 302 a trigger for the first communication channel. Queue process 10 may send 304 the user a self-service option based upon, at least in part, identifying the trigger for the first communication channel, wherein the self-service option may be sent on an alternate communication channel while the user is in the first queue.

In some implementations, queue process 10 may place 300, by a computing device, a user into a first queue on a first communication channel to converse with a second user. For instance, and referring to the example implementation of FIG. 4, an example alternative flowchart of queue process 10 is shown. In the example, assume for example purposes only that a user (e.g., user 48) wants to talk to a second user (e.g., agent 400). User 48 may do this by, e.g., calling a customer service phone number, clicking on a link on a customer service website to open a customer service "live chat" session, or otherwise offered contact communication channel options (e.g., phone, live chat, etc.). Assume for example purposes only that user 48 uses client electronic device 42 to call the customer service phone number, and is presented with the option to select a number (e.g., 0) to speak with a customer service representative (e.g., via an IVR system). In the example, once the user selects "0", user 48 may be placed in a call waiting queue (e.g., queue 402) to wait to speak with agent 400, which may take some time based upon how many other users are ahead of user 48 and how many other agents are available. It will be appreciated that other communication channels may also be used without departing from the scope of the present disclosure. As such, the use of a phone call or live chat should be taken as example only, and not to otherwise limit the scope of the present disclosure.

In some implementations, queue process 10 may identify 302 a trigger for the first communication channel. For example, in some implementations, the trigger may be a threshold amount of time estimated for user 48 to be in the first queue (e.g., queue 402) on the first communication channel (e.g., phone) before being connected to the second user (e.g., agent 400). In the example, queue process 10 may include a waiting mechanism that can estimate the expected wait time (e.g., "due to extreme call volumes, your call is expected to be answered in about 30 minutes"), which may be based upon such things as the number of callers ahead of user 48, average time for other users to complete their phone calls, the number of available agents, etc. In the example, assume that queue process 10 has a default setting (which may be changed by an administrator, etc.) such that an estimated wait time of 30 minutes in queue 402 would be considered too long a time to wait before being connected to agent 400. As such, in the example, an estimated wait time of 30 minutes may be identified as a trigger for the phone call. It will be appreciated that other triggers may individually or in combination have thresholds, such as, e.g., the number of people in the queue, speed at which contacts are being answered, number of agents at the contact center, etc.

In some implementations, the trigger may be a threshold amount of time for user 48 to be in the queue 402 on the first communication channel (phone call) before being connected to the second user (e.g., agent 400). For example, and continuing with the above example, assume that queue process 10 has a default setting (which may be changed by an administrator, etc.) such that an actual wait time of 30 minutes in queue 402 would be considered too long a time to wait before being connected to agent 400. Further assume that there is an estimated wait time of only 25 minutes, however, this estimate was incorrect and user 48 is still in queue 402 for 30 minutes. In the example, user 48 being in queue 402 for an actual time of 30 minutes, regardless of any estimated wait time being below 30 minutes, may be identified as a trigger for the phone call. It will be appreciated that an estimated threshold is not necessarily needed if the trigger is the actual time that user 48 is in the queue; however, both thresholds may be used in combination as the trigger.

In some implementations, queue process 10 may send 304 the user a self-service option based upon, at least in part, identifying the trigger for the first communication channel, wherein the self-service option may be sent on an alternate communication channel while the user is in the first queue. For instance, and continuing with the above example where the trigger of user 48 being in queue 402 longer than 30 minutes, or having an estimated wait time of longer than 30 minutes, has been identified. In the example, at that point, the trigger may result in queue process 10 sending user 48 a parallel interaction (communication) that would proactively reach out to the customer via a different communication channel (e.g., SMS, email, etc.). For instance, queue process 10 may send an email, text message, pop-up window, etc., to user 48. For clarification, while the mobile device (e.g., client electronic device 42) may be used to receive and access the email, text message, etc., the email and text would be considered an alternate communication channel, as they are different than the communication channel used for the actual phone call itself. That is, the alternate communication channel need not (but may) include a different client electronic device (e.g., client electronic device 40). In the example, the parallel communication (e.g., text message in this example) may include some type of apology about the wait, and may offer user 48 some self-service alternatives, while user 48 continues to wait in queue 402 to speak with agent 400. In some implementations, the self-service alternatives may include one or more optional links, that when selected by user 48, executes interaction with a Virtual Assistant (VA) chatbot, or opens a frequently asked questions (FAQs) web page, etc. Ideally, these self-service options may be used by user 48 to resolve the reason why user 48 called to speak with agent 400 (e.g., troubleshooting an internet connection) before their turn in queue 402 comes up, thereby obviating the need to continue in the phone call queue and having them hang up (or closing the live chat window), thereby reducing the hold time for other users still in the phone call queue or live chat queue, hence effectively deflecting the contact For example, whenever one starts an interaction on a channel, one normally gets assigned a "Session ID". During that session, the system may identify who the user is along with other information pertaining to that interaction, such as the intent/reason for their contact, etc. So, imagine a user is calling in (and receives Session ID 5001) and the user tells the system the user is calling because the user sees a charge that the user does not recognize in their bill (intent="bill_question") and the user is transferred. Then, based on the conditions, the user gets a text message giving the user some options related to bills that the user can review while the user waits (e.g., the user is assigned Session ID 7006 on the SMS channels which is now linked to Session ID 5001 on the IVR channel) and because the system initiated the $2^{nd}$ interaction, it knows what the original intent was that triggered the initial text message (intent="bill_question"). Therefore, if by interacting with a bot via text messages the user is able to get the answer the user is looking for (e.g., the user can browse across a list of transactions and look at transaction details like amounts and dates that let the user know it is a legitimate charge) and the user tells the system that's all the user needed, the system could then terminate that SMS chat session and look for any other sessions linked to it, effectively marking the related IVR phone session as finished and closing that as well.

In some implementations, queue process 10 may place 306 the user into a second queue on a second communication channel to converse with a third user based upon, at least in part, identifying the trigger for the first communication channel, wherein the first communication channel and the second communication channel may be operating in parallel. For example, the self-service options may also include a link to place user 48 into a different queue (e.g., a live agent chat queue) based upon identifying the trigger. Thus, in the example, user 48 would be in the queue for speaking with the agent on the phone, but simultaneously (in parallel) being placed into another queue to converse with a live agent via chat/text. In some implementations, being placed in the second queue may be automatic, rather than requiring user 48 to select the live chat option. This may be beneficial, as it is possible there is a shorter wait for the live chat queue than the phone call queue, and thus user 48 may have their issue resolved faster in the live chat, obviating the need to continue in the phone call queue, thereby reducing the hold time for other users still in the phone call queue. It will be appreciated that the live chat may be the first communication channel used, and the phone call may be the second communication channel used. As such, the description of a phone call being the first communication and the live chat being the second communication channel should be taken as example only and not to otherwise limit the scope of the present disclosure.

In some implementations, one of the first communication channel and the self-service option may be automatically terminated based upon, at least in part, receiving an input from one of the user and the second user. For instance, assume for example purposes only that user 48 is able to resolve their issue by speaking with agent 400. In the example, an input may be received (e.g., user 48 may hang up the phone, agent 400 may disconnect/hang up the phone, etc.) which may result in the automatic closing of the live chat, virtual assistant, FAQ bot, etc. Conversely, if user 48 is able to resolve their issue by using the self-service options (e.g., live chat or using the virtual assistant), an input may be received (e.g., user 48 may close the virtual assistant or live chat window, agent 400 may disconnect from the live chat, etc.) which may result in the automatic hanging up of the phone (and thus removal of user 48 from queue 402).

In some implementations, queue process 10 may forward 308 information collected during the self-service option to the second user. For instance, assume for example purposes only that user 48 has been using the virtual assistant, selecting FAQ links or searches, or conversing in the live agent chat, etc. In the example, the conversation with the virtual assistant, live agent chat, and links selected/searches entered may be provided to a display used by agent 400 once user 48 actually connects to agent 400, or may be provided to the display used by agent 400 in real-time should user 48 already be connected to agent 400. Conversely, any notes taken by agent 400 on the phone with user 48 may also be provided to the display used by the live chat agent. This may help either agent resolve the issue of user 48 faster, as they would have more information about the issue, and would prevent user 48 from having to repeat themselves. Similar information from previous calls/chats may also be provided.

In some implementations, queue process 10 may prioritize 310 the user in one of the first queue on the first communication channel and the second queue on the second communication channel based upon, at least in part, a prior placement of the user in one of the first queue on the first communication channel and the second queue on the second communication channel. For instance, should user 48 get disconnected while in queue 402 or while speaking with agent 400 (e.g., accidentally or intentionally), user 48 may be given a priority when user 48 calls back (e.g., placed ahead of those in the call queue or live chat queue calling for the first time within some threshold amount of time). For instance, if user 48 was accidentally disconnected from the call (e.g., due to a dropped call), upon calling back, user 48 may be placed in queue 402 ahead of those callers who are calling for the first time (or a different queue specific for callback users), but behind other callers who have also already called back due to a dropped call. A similar implementation may be used where user 48 chooses to hang up the phone (believing the problem to be solved by agent 400), but needs to call back to further address the issue. Similarly, user 48 may be given priority in the live chat queue in like circumstances. Queue process may identify user 48 once again contacting agent 400 (or live chat agent) using, e.g., caller ID, IP address, biometric voice recognition, or any other technique. In some implementations, user 48 waiting longer than a threshold amount of time (e.g., minutes, hours, days, weeks, etc.) to once again contact agent 400 (or live chat agent) may result in user 48 being placed in the queue as if it were the first time calling/connecting to the live chat agent. In some implementations, this threshold may be a default that may be adjustable by an administrator or other user.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   placing, by a computing device, a user into a first queue on a first communication channel to converse with a second user, wherein the user has a particular reason for conversing with the second user;
   identifying a trigger for the first communication channel, wherein the trigger is a time based trigger;
   sending the user a self-service option based upon, at least in part, identifying the trigger for the first communication channel, wherein the self-service option is sent on an alternate communication channel while the user is in the first queue;
   receiving an indication from the user that the self-service option has resolved the particular reason for the user conversing with the second user and terminating both the first communication channel and the alternate communication channel in response to receiving the indication; and prioritizing the user with respect to at least one of the first communication channel and a second communication channel based upon, at least in part, a prior placement of the user with respect to at least one of the first communication channel and the second communication channel when the prior placement is less than a threshold amount of time, and not prioritizing the user with respect to at least one of the first communication channel and the second communication channel when the prior placement is greater than the threshold amount of time.

2. The computer-implemented method of claim 1 wherein the trigger is a threshold amount of time estimated for the user to be in the first queue on the first communication channel before being connected to the second user.

3. The computer-implemented method of claim 1 wherein the trigger is a threshold amount of time for the user to be in the first queue on the first communication channel before being connected to the second user.

4. The computer-implemented method of claim 1 further comprising placing the user into a second queue on a second communication channel to converse with a third user based upon, at least in part, identifying the trigger for the first communication channel, wherein the first communication channel and the second communication channel are operating in parallel.

5. The computer-implemented method of claim 1 further comprising forwarding information collected during the self-service option to the second user.

6. The computer-implemented method of claim 1 wherein one of the first communication channel and the self-service option is automatically terminated based upon, at least in part, receiving an input from one of the user and the second user.

7. A computer program product residing on a non-transitory computer readable storage medium having a plurality of instructions stored thereon which, when executed across one or more processors, causes at least a portion of the one or more processors to perform operations comprising:

placing, by a computing device, a user into a first queue on a first communication channel to converse with a second user, wherein the user has a particular reason for conversing with the second user;

identifying a trigger for the first communication channel, wherein the trigger is a time based trigger;

sending the user a self-service option based upon, at least in part, identifying the trigger for the first communication channel, wherein the self-service option is sent on an alternate communication channel while the user is in the first queue;

receiving an indication from the user that the self-service option has resolved the particular reason for the user conversing with the second user and terminating both the first communication channel and the alternate communication channel in response to receiving the indication; and prioritizing the user with respect to at least one of the first communication channel and a second communication channel based upon, at least in part, a prior placement of the user with respect to at least one of the first communication channel and the second communication channel when the prior placement is less than a threshold amount of time, and not prioritizing the user with respect to at least one of the first communication channel and the second communication channel when the prior placement is greater than the threshold amount of time.

8. The computer program product of claim 7 wherein the trigger is a threshold amount of time estimated for the user to be in the first queue on the first communication channel before being connected to the second user.

9. The computer program product of claim 7 wherein the trigger is a threshold amount of time for the user to be in the first queue on the first communication channel before being connected to the second user.

10. The computer program product of claim 7 wherein the operations further comprise placing the user into a second queue on a second communication channel to converse with a third user based upon, at least in part, identifying the trigger for the first communication channel, wherein the first communication channel and the second communication channel are operating in parallel.

11. The computer program product of claim 7 wherein the operations further comprise forwarding information collected during the self-service option to the second user.

12. The computer program product of claim 7 wherein one of the first communication channel and the self-service option is automatically terminated based upon, at least in part, receiving an input from one of the user and the second user.

13. A computing system including one or more processors and one or more memories configured to perform operations comprising:

placing, by a computing device, a user into a first queue on a first communication channel to converse with a second user, wherein the user has a particular reason for conversing with the second user;

identifying a trigger for the first communication channel, wherein the trigger is a time based trigger;

sending the user a self-service option based upon, at least in part, identifying the trigger for the first communication channel, wherein the self-service option is sent on an alternate communication channel while the user is in the first queue;

receiving an indication from the user that the self-service option has resolved the particular reason for the user conversing with the second user and terminating both the first communication channel and the alternate communication channel in response to receiving the indication; and prioritizing the user with respect to at least one of the first communication channel and a second communication channel based upon, at least in part, a prior placement of the user with respect to at least one of the first communication channel and the second communication channel when the prior placement is less than a threshold amount of time, and not prioritizing the user with respect to at least one of the first communication channel and the second communication channel when the prior placement is greater than the threshold amount of time.

14. The computing system of claim 13 wherein the trigger is one of a threshold amount of time estimated for the user to be in the first queue on the first communication channel before being connected to the second user and a threshold amount of time for the user to be in the first queue on the first communication channel before being connected to the second user.

15. The computing system of claim 13 wherein the operations further comprise placing the user into a second queue on a second communication channel to converse with a third user based upon, at least in part, identifying the trigger for the first communication channel, wherein the first communication channel and the second communication channel are operating in parallel.

16. The computing system of claim 13 wherein the operations further comprise forwarding information collected during the self-service option to the second user.

17. The computing system of claim 13 wherein one of the first communication channel and the self-service option is automatically terminated based upon, at least in part, receiving an input from one of the user and the second user.

* * * * *